United States Patent [19]

Mosley

[11] Patent Number: 4,660,426

[45] Date of Patent: Apr. 28, 1987

[54] PUMPING UNIT FOR ACTUATING A DOWN HOLE PUMP WITH STATIC AND DYNAMIC COUNTERWEIGHTS

[75] Inventor: Bobbie L. Mosley, Gillette, Wyo.

[73] Assignee: Infinity Pumping Systems, Riverton, Wyo.

[21] Appl. No.: 736,179

[22] Filed: May 20, 1985

[51] Int. Cl.[4] .............................................. F04B 47/02
[52] U.S. Cl. ........................................................... 74/41
[58] Field of Search .................................... 74/41, 591

[56] References Cited

U.S. PATENT DOCUMENTS

| | | |
|---|---|---|
| 1,293,609 | 9/1917 | Dayton . |
| 1,592,391 | 7/1926 | Stevenson ................................ 74/41 |
| 1,758,609 | 5/1930 | Kammerer . |
| 1,780,993 | 11/1930 | Burnelli . |
| 1,866,049 | 7/1932 | Marsh . |
| 1,917,701 | 7/1933 | Crites et al. . |
| 1,948,288 | 2/1934 | Corey ...................................... 74/591 |
| 1,953,903 | 4/1934 | Austin . |
| 1,986,012 | 1/1935 | Patterson . |
| 2,042,294 | 5/1936 | Bloss ........................................ 74/41 |
| 2,184,200 | 12/1939 | Thomas . |
| 2,488,124 | 11/1949 | Hawley et al. ......................... 74/41 |
| 2,579,112 | 12/1951 | Fullerton ................................ 74/41 |
| 2,627,759 | 2/1953 | Fincher . |
| 2,915,919 | 12/1959 | Mitchell et al. . |
| 2,958,237 | 11/1960 | Johnson . |
| 3,016,767 | 1/1962 | Egan et al. . |
| 3,029,650 | 4/1962 | Byrd . |
| 3,192,797 | 7/1965 | Patterson . |
| 3,208,291 | 9/1965 | Ross ........................................ 74/41 |
| 3,209,605 | 10/1965 | Scoggins, Jr. . |
| 3,221,568 | 12/1965 | Ross ........................................ 74/41 |
| 3,222,940 | 12/1965 | Chastain ................................ 74/41 |
| 3,230,782 | 1/1966 | Harryman et al. . |
| 3,364,755 | 1/1968 | Miller . |
| 3,371,554 | 3/1968 | McCray et al. . |
| 4,051,736 | 10/1977 | Jones . |
| 4,306,463 | 12/1981 | King . |
| 4,321,837 | 3/1982 | Grigsby . |
| 4,406,122 | 9/1983 | McDuffle . |
| 4,408,485 | 10/1983 | McGill . |
| 4,424,860 | 1/1984 | McGill . |
| 4,430,924 | 2/1984 | Dunn et al. . |
| 4,440,230 | 4/1984 | McGill . |
| 4,461,187 | 7/1984 | Stanton .................................. 74/41 |
| 4,484,484 | 11/1984 | Wissink et al. . |
| 4,490,094 | 12/1984 | Gibbs . |
| 4,502,343 | 3/1985 | Dingfelder . |
| 4,505,162 | 3/1985 | Hoh et al. . |
| 4,509,378 | 4/1985 | Brown . |

OTHER PUBLICATIONS

Catalog of Lufkin Industries, Inc. showing a conventional pumping unit and other variations on the conventional pumping unit.

Primary Examiner—Lawrence J. Staab
Attorney, Agent, or Firm—Gregg I. Anderson

[57] ABSTRACT

A pumping unit for actuating a down hole pump is disclosed for a pumping units of the type wherein a counterweight is mounted on a beam to balance a down hole load consisting substantially of pump rods. One end of the beam includes a static counterweight to balance the other end of the beam about a center pivot point, the other end of the beam including a horsehead connected to the pump rods. A prime mover is mounted on the beam for rotating beam mounted cranks including at a terminal end thereof dynamic counterweights which move in a rotational cycle in conjunction with a pumping cycle of the pumping unit. The dynamic counterweights, at a maximum lever arm from the center pivot point of the beam, counterbalance the fluid being pumped during the work stroke of the pumping unit. As the dynamic counterweight rotates it passes through a minimum lever arm from the center point corresponding to a minimum down hole load. The rotational cycle of the second counterweight is timed to correspond with the pumping cycle, maximizing the counterweight effect during a work stroke and minimizing the counterweight that must be raised by the prime mover during a return stroke.

16 Claims, 12 Drawing Figures

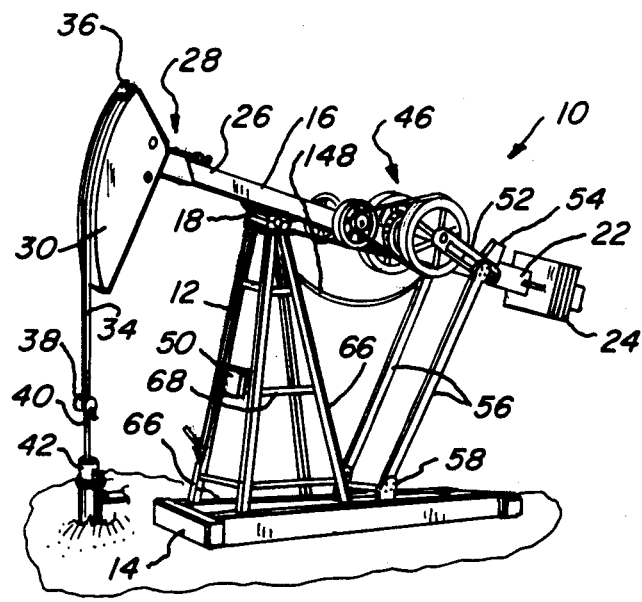
Fig_1
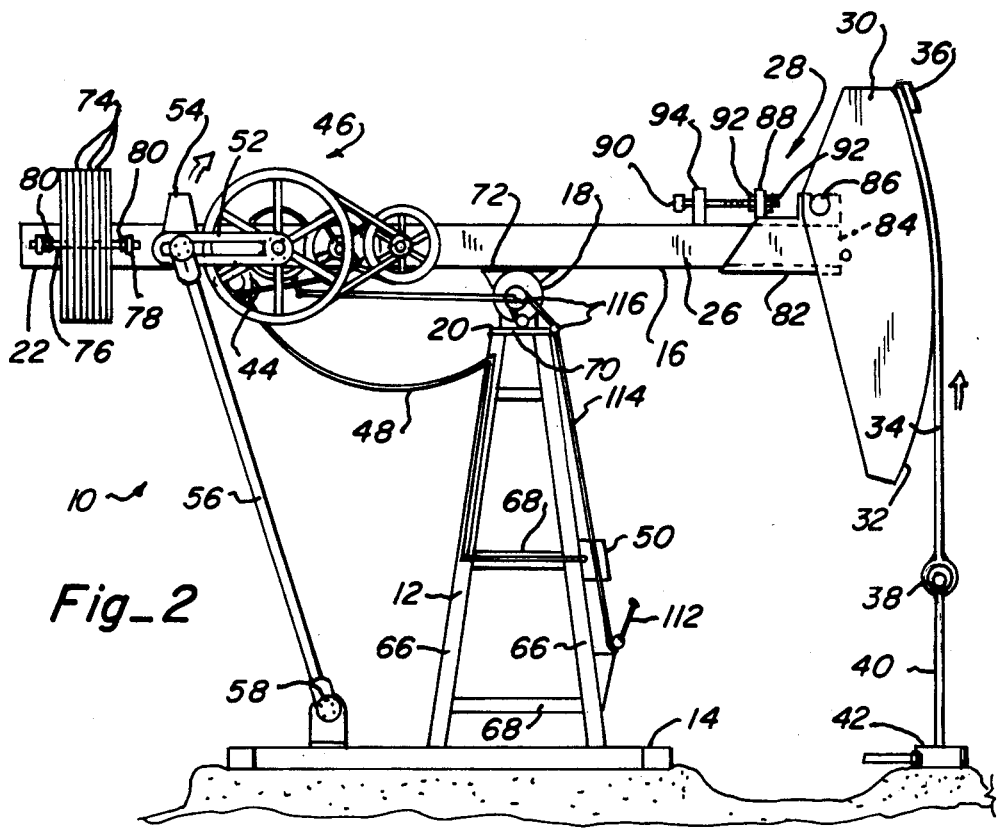
Fig_2

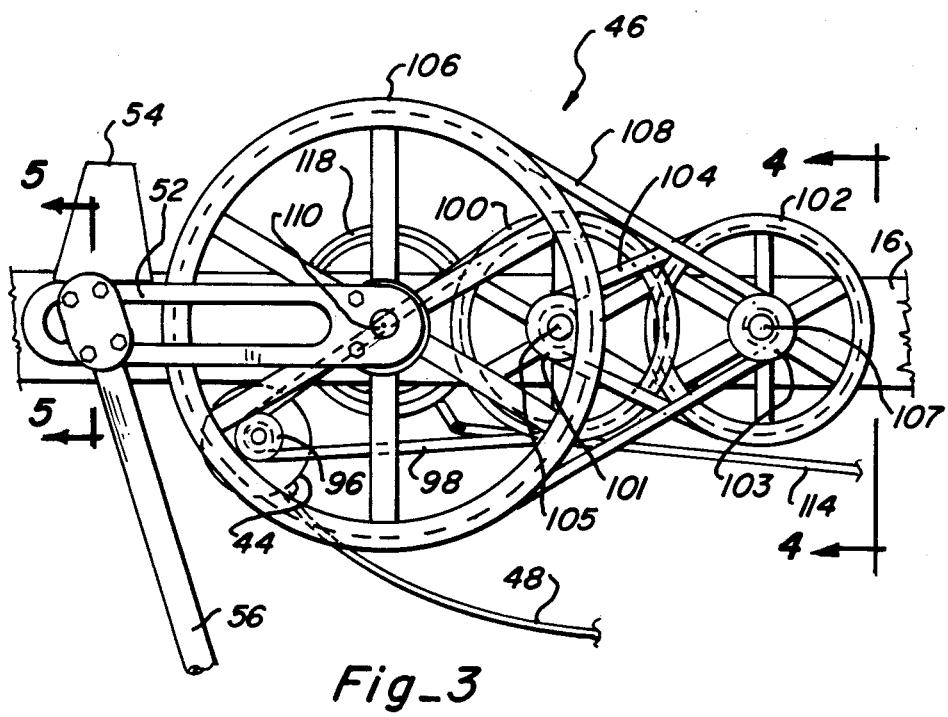
Fig_3
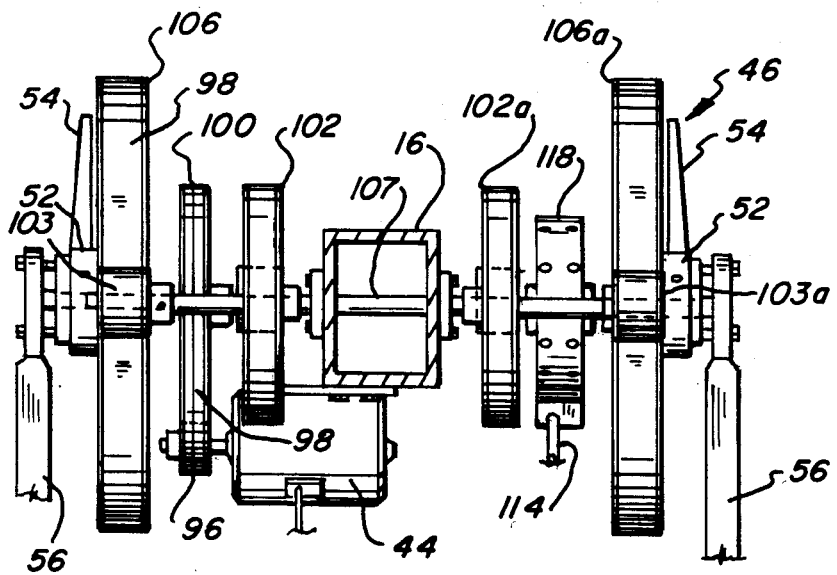
Fig_4

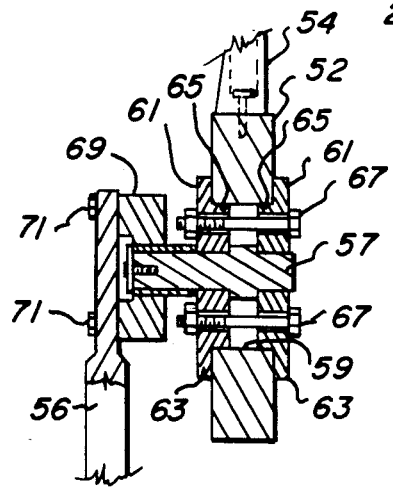
Fig_5
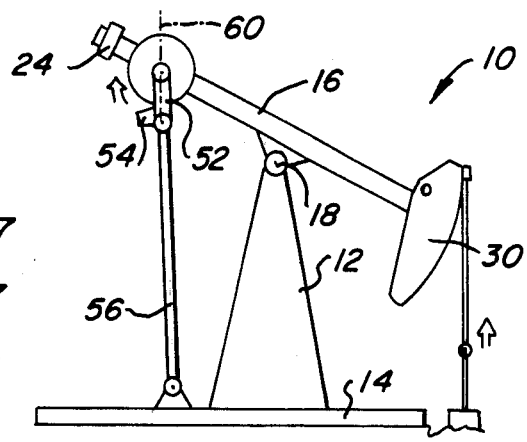
Fig_6
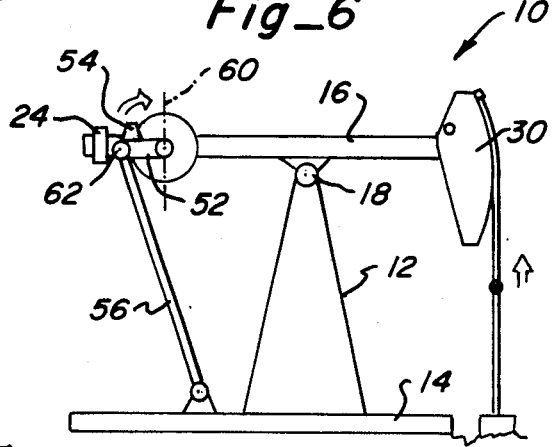
Fig_7
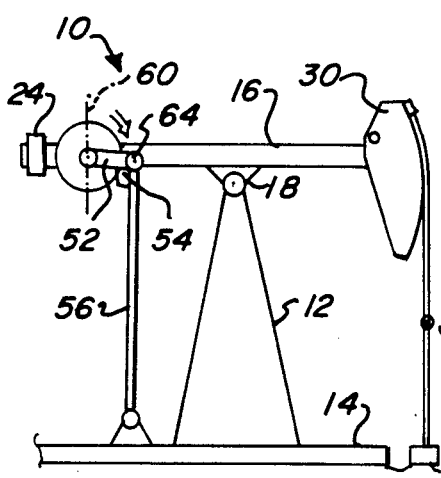
Fig_9
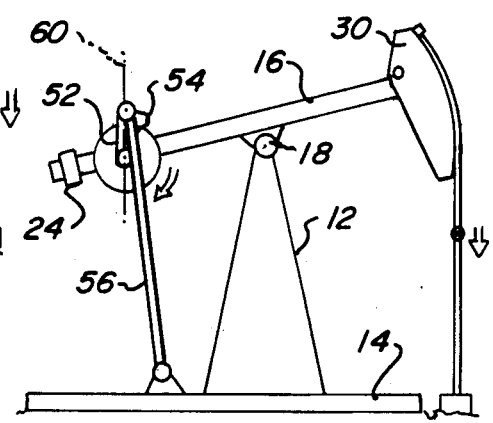
Fig_8

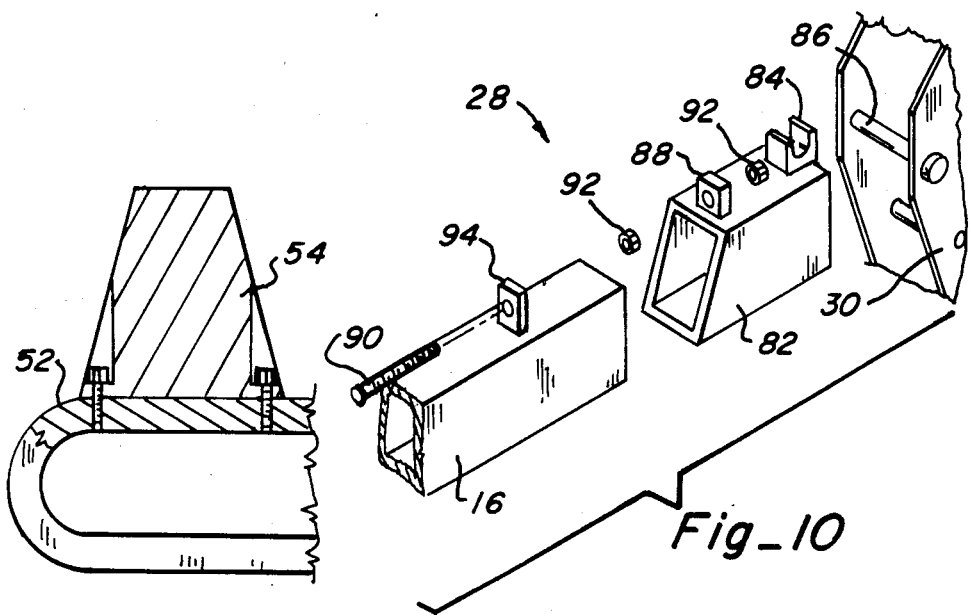
Fig_10
Fig_11
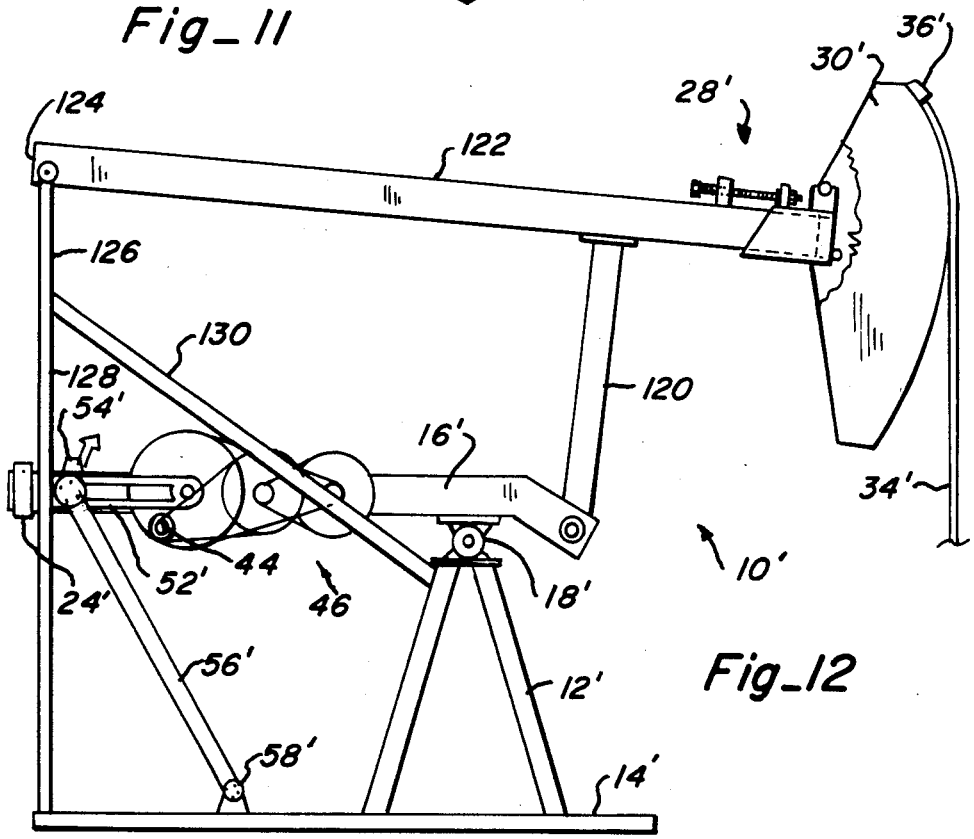
Fig_12

PUMPING UNIT FOR ACTUATING A DOWN HOLE PUMP WITH STATIC AND DYNAMIC COUNTERWEIGHTS

BACKGROUND OF THE INVENTION

1. Field of Invention

The present invention relates to a pumping unit for actuating a down hole pump for raising water or oil held in an earth formation to the surface. More particularly, the present invention relates to pumping units which include a samson post pivotally connected by a center bearing to a walking beam. One end of the walking beam has fixedly connected thereto a stationary counterweight to counter balance the other end of the walking beam, to which other end is connected a string of pump rod operatively connected to the down hole pump.

2. Description of the Prior Art

Walking beam or "horsehead" type pumping units have been used for decades to actuate down hole pumps, forcing water or oil to the surface from a subterranean water or oil bearing formation. All of the horsehead pumping units include a wire line or cable connected to the horsehead, passing over a convex outer face curved about the pivotal axis of the walking beam. The cable or wireline lies on the curved outer face of the horsehead tangent to the outer face in a vertical position over a well head regardless of the position of he horsehead in its stroke. The wireline connects at its lower end to a drill string of pump rod by wire clamps or connecting devices. The flexible cable or wireline lying on the curved face of the horsehead provides for vertical reciprocation of the pump rod as the horsehead goes through its stroke, without bending the rod. The pump rods are connected to the piston of the down hole pump so that, as the horsehead moves upwardly during a work stroke of an oscillatory cycle, fluid is pumped. During a return stroke of the oscillatory cycle the piston of the down hole pump is returned to its starting position.

In all of the known walking beam pumping units some counterbalancing arrangement is used. The oldest known walking beam pumping units, conventional units, have a prime mover and the samson post both connected to the base. In the conventional pumping unit, a counterweighed crank is connected to the prime mover through a gear reducer. The crank in turn is connected at the counterweight through a pair of pitman rods to one end of the walking beam. As the counterweight realizes its potential energy and passes from the top to the bottom of its rotation, it assists the prime mover in overcoming the load of the pump rods and fluid being pumped during the work stroke by counterbalancing the load. During the return stroke, the prime mover must raise the counterweight from a bottom position to a top position so that the potential of the counterweights can again be realized during the next work stroke. This is a simple system but requires a relatively high horsepower rated prime mover to move the counterweight through the rotational cycle.

A relatively recent innovation to pumping units pivotally connects the samson post at the one end of the walking beam while the pitman rods are connected through a cross-yoke equalizer bearing to the other or horsehead end of the walking beam. A crank includes counterweights, but the pitman rods are connected to rearward extensions of the crank, rather than connected at the counterweight, as in the conventional units.

Beam balanced pumping units have no counterweight associated with the crank, but instead use a fixed counterweight mounted to the one end of the walking beam opposite the horsehead to offset some of the down hole loads. Such a beam balanced pumping units is seen in E. Patterson, U.S. Pat. No. 1,986,012. As in all known beam balanced pumping units, the counterweights of Patterson are used to counterbalance the string of pump rods, the work output of the prime move being used to reciprocate the walking beam and pump the fluid. Patterson is unique over other prior art pumping units in that the samson post carries the prime mover which turns a pair of sprockets mounted on the walking beam. A pair of pitman rods connect the sprockets to the base so that the oscillating up and down movement of the horsehead required in such pumping units is obtained by pivotally connecting the pitman rods to the base, rather than to the walking beam, as in the conventional pumping units. Patterson, along with other prior art structures, shows and discloses a structure consisting of various different openings in the sprocket through which pin connections are secured. Variations of which opening is used, varies the stroke length or distance through which the horsehead moves.

Instead of counterweights, an air tank carrying a piston rod is used to counterbalance some of the down hole weight of the pump rod and fluid during the work stroke in another variation of the walking beam pumping unit.

G. King, U.S. Pat. No. 4,306,463, shows a walking beam driven in the oscillatory up and down pumping cycle by a pair of periodically moving balance weights, interconnected for concurrent periodic movement. While one balance weight is falling to move the walking beam, the other weight is being raised by the prime mover, in this case an hydraulic cyclinder. The walking beam also includes stationary counterweights which serve to counterbalance the horsehead, pump rod load and maximum expected fluid column load. The moving balance weights do not rotate on the walking beam.

Various adjustable stroke mechanisms are shown for pumping units. T. Hoh, et al., U.S. Pat. No. 4,505,162 shows a slot formed in a crank arm. A wrist pin assembly is slideable in the slot and lockable at any point along the slot. A pitman rod is connected to the wrist pin. A. dingfelder, U.S. Pat. No. 4,502,343, shows a single pitman rod having an infinite adjustment between limits. A turnbuckle is used to change the length of the pitman rod. Adjustment of the connection point of the pitman rod to the walking beam is also shown. C. Johnson, U.S. Pat. No. 2,958,237, shows another threadable connection for varying the stroke length of a walking beam pumping unit.

None of the prior art structures or prior art patent publications show use of a static counterweight connected to the beam to balance the pump rod load and a dynamic rotating counterweight mounted on the beam to balance the cyclical fluid column load. The advantage of such an arrangement, such as the invention to be described hereinafter, includes lowering the torque and horsepower requirements of the prime mover required for a given pumping unit. An additional benefit of such a rotating counterweight, as presently contemplated, is reduction of the stress in the pump rod string by minimizing the difference between the peak pump rod load and the minimum pump rod load.

OBJECTS AND SUMMARY OF THE INVENTION

It is the principal object of the present invention to provide a pumping unit for actuating a down hole pump which uses a fixed static counterweight mounted on a walking beam to counterbalance a pump rod load and a dynamic rotating counterweight which moves in conjunction with an oscillation cycle of the walking beam to counterbalance the fluid load.

It is a related object of the present invention to provide a pumping unit for actuating a down hole pump wherein the dynamically moving counterweight has a maximum lever arm when the pumping units is in a work stroke of the cycle and a minimum lever arm when the pumping unit is in a return stroke of the cycle.

It is a further related object of the present invention to provide a pumping unit for actuating a down hole pump wherein the torque requirements and horsepower requirements of the prime mover are minimized by taking full advantage of both a static and a dynamic counterweight.

It is a still further related object of the present invention to provide a pumping unit for actuating a down hole pump which minimizes the difference between the peak pump rod load and the minimum pump rod load, to thereby reduce the stress in the pump rod and increase rod life.

It is another object of the present invention to provide a pumping unit for actuating a down hole pump wherein the stroke length can be infinitely varied between a minimum and maximum limit.

It is a further object of the present invention to provide a pumping unit for actuating a down hole pump wherein a horsehead connection is adjustably movable along the length of the walking beam to thereby vary stroke length of the pumping unit.

It is still another object of the present invention to provide a pumping unit for actuating a down hole pump where the prime mover and reducing gear interconnecting the prime mover to crank arms for providing oscillating movement to the walking beam are used to assist the fixed counterweight in counterbalancing the pump rod load.

In accordance with the objects of the invention, a pumping unit for a down hole pump for fluids such as water and oil contained in subterranean formations includes a base to which base is rigidly connected a samson post. A walking beam is connected for pivotal movement to the top of the samson post through a center bearing. The walking beam is oscillated or pivoted about an horizontal axis defined by the center bearing by a prime mover operatively interconnecting the walking beam and the base.

One end of the walking beam has connected thereto a first static counterweight of adjustable magnitude. Another end of the walking beam is connected to a string of pump rod, which pump rod is connected to a piston of the down hole pump. The static counterweight, together with the prime mover and a gear reducer, are connected to the walking beam intermediate the one end and the center bearing, counterbalancing the entire pump rod load.

The other end of the walking beam has slideably mounted thereon a horsehead, the slideable connection providing for variation of the counterbalance effect. In a conventional manner, the horsehead includes a convex outer surface curved about the horizontal pivotal axis of the walking beam. A cable or wireline is connected to the horsehead and passes along the outer convex surface to connect to the string of pump rod.

The prime mover and gear reducer are connected to a crank mounted on the walking beam adjustment the prime mover and gear reducer. A second dynamic counterweight is connected at a terminal end of the crank, the terminal end pivotally connected through a pitman rod to the base. The dynamic counterweight rotates relative to the walking beam in a preestablished rotational cycle coordinated with the oscillatory pumping cycle of the pumping out. As the horsehead moves up in a work stroke of the pumping cycle, the dynamic unidirectionally moves 180° from a bottommost to a uppermost position in its own rotational cycle, passing through a maximum lever arm distance from the center bearing. As the horsehead moves downwardly in a return stroke of the pumping cycle, the dynamic, counterweight moves from its uppermost position to its bottommost position, passing through a minimum lever arm distance from the center bearing.

The maximum lever arm distance gives the greatest counterbalance benefit on the load, when the fluid is being pumped. The counterbalance effect on the is minimized when the dynamic counterweight passes through the minimum lever arm as the prime mover raises the one end of the walking beam.

The connection between the pitman rod and the crank arm is infinitely variable between two limits. The crank is slotted and a wrist pin arrangement is provided for variation of the connection point between the crank and the pitman rod.

A yoke assembly connects the horsehead to the other end of the walking beam. The yoke assembly is slideable along the walking beam, varying the stroke length of the pumping unit.

DESCRIPTION OF THE DRAWINGS

FIG. 1 is a perspective view of a pumping unit for actuating a down hole pump of the present invention.

FIG. 2 is a side elevational view of the invention shown in FIG. 1.

FIG. 3 is a fragmentary enlarged side elevational view of a crank and a gear reducer of the invention shown in FIG. 1.

FIG. 4 is an end view similar to FIG. 3.

FIG. 5 is a sectional view taken through the plane of line 5—5 of FIG. 3.

FIGS. 6 through 9 are schematic views showing the position of a dynamic counterweight of the present invention as the pumping unit goes through the two strokes of its pumping cycle, an upward work stroke and a downward return stroke.

FIG. 10 is a fragmentary exploded perspective view of a yoke assembly connecting a horsehead to a walking beam of the invention shown in FIG. 1.

FIG. 11 is a fragmentary sectional view of a connection between the dynamic counterweight and the crank of the invention shown in FIG. 1.

FIG. 12 is a side elevational view of an alternative embodiment of the invention shown in FIG. 1.

DESCRIPTION OF THE PREFERRED EMBODIMENTS

A pumping unit 10 for actuating a down hole pump (not shown) is used to raise water or oil from a down hole bore in a subterranean earth formation, to the surface of the earth. A samson post 12 is mounted to a base 14, and pivotally connects to a walking beam 16 through a center bearing 18 mounted at an apex 20 of the samson post. (FIGS. 1 and 2.) The walking beam 16 is supported by and connected to the center bearing 18 at approximately a mid-point along its' the length. One end 22 of the walking beam 16 has releasably mounted thereon a first static counterweight 24. Another end 26 of the walking beam 16 has slideably mounted thereon a yoke assembly 28 to which yoke assembly 28 is connected a horsehead 30. An outer convex surface 32 of the horsehead 30 is curved about the pivotal axis of the walking beam 16 defined by the center bearing 18. A wireline or cable 34 is connected in a well known manner by the arc plate 36 to the horsehead 30. A conventional carrier bar 38 connects to distal end eyelets of the wireline 34. A polishing rod 40 is connected to the carrier bar 38 and passes through a wellheadseal 42 into the down hole bore. The polishing rod 40 connects to a string of pump rod. In turn, the pump rod is connected to a piston of the down hole pump. The down hole apparatus connections described are not shown, all being known in the art.

In a known arrangement, the first counterweight 24 substantially counterbalances the load at the other end 26 of the walking beam 16 including the horsehead 30 and string of pump rod. In the pumping unit 10 of the present invention, the load at the other end 26 of the walking beam 16 is in part offset by a prime mover 44 and gear reducer 46 mounted on the walking beam 16 at a location intermediate the center bearing connection to the walking beam 16 and the first counterweight 24. In the embodiment shown, the prime mover 44 is an electric motor connected by conductors 48 to a power supply or outlet 50.

The prime mover 44 is connected through the gear reducer 46 to a crank 52 rotatably mounted on either side of the walking beam 16. The crank 52 is adjacent the gear reducer 46 and prime mover 44 and thus is also mounted intermediate the center bearing connection to the walking beam and the first counterweight 24. The prime mover 44 turns the crank 52 through the gear reducer 46 in a unidirectionally clockwise rotational direction, with reference to FIG. 2. This rotational cycle of the crank 52 is at a predetermined rotational rate to coordinate with and move in conjunction with a pumping cycle of the pumping unit 10. The pumping cycle of the pumping unit 10 includes a work stroke in which the horsehead 30 and connected wireline 34 is moved upwardly, forcing a fluid column to be raised by the pump, and a return stroke, in which the horsehead 30 and wireline 34 return the piston of the pump to a starting position.

The crank 52 includes at a terminal end a second dynamic counterweight 54 fixedly attached to the crank 54, as by bolts (FIG. 11), for unidirectional rotational movement with the crank 52 and in the preestablished rotational cycle at the predetermined rotational rate coordinated with the pumping cycle. The crank 52 is rotatably connected to one end of a pitman rod 56, the other end of the pitman rod 56 pivotally connected at 58 to the base, such as by a pin connection. Rotation of the crank 52 thereby imparts oscillatory of reciprocating movement to the walking beam 16, the horsehead 30 and connected pump rod, defining the pumping cycle.

The preestablished timing between the rotational cycle of the second counterweight 54 and the pumping cycle of the horsehead 30 is seen in FIGS. 6 through 9. As the horsehead 30 moves up during the work stroke, the second counterweight 54 is in a bottommost position. (FIG. 6.) In the bottommost position, the counterweight 54 and crank 52 are aligned with a vertical axis 60 through the rotational connection between the walking beam 16 and the crank 52, the walking beam 16 making an angle with respect to the vertical axis 60. At approximately half way through the work stroke, the second counterweight 54 and crank 52 are longitudinally aligned along the walking beam 16, at a ninety degree angle to the vertical axis 60. (FIG. 7.) At this point in the rotational cycle, a maximum lever arm distance 62 between the center bearing 18 pivot support point and the second counterweight 54 is reached resulting in the greatest moment and counberbalance effect to the load. As the horsehead 30 reaches the highest point in the work stroke, the second counterweight is at its uppermost position, the crank 52 again aligned with the vertical axis 60. (FIG. 8.) The return stroke begins.

As the horsehead 30 moves downwardly in the return stroke, the counterweight 54 and crank 52 again are aligned with a longitudinal axis of the walking beam ninety degrees from vertical. A minimum lever arm distance 64 is defined between the center bearing 18 pivot support point and the second counterweight 54, in the rotational cycle. (FIG. 9.) At this time in the rotational cycle, the prime mover 44 is raising the one end 22 of the walking beam 16 and the first counterweight 24, the second counterweight 54 is at a minimum moment or lever arm 64 and the counterbalance effect is also at a minimum. As a result, the prime mover 44 needs less torque and horsepower to raise the one end 22 so that a smaller rated prime mover can be used. As the horsehead 30 reaches the bottom of the return cycle, the second counterweight 54 returns to the bottommost position and the pumping cycle is repeated. (FIG. 6.)

The samson post 12 is of entirely conventional construction including four legs 66 secured to the base 14 at four corners of a square. The legs 66 are interconnected by horizontal brace members 68 and the apex 20 of the samson post 12 has a platform 70 to which the center bearing 18 is mounted. The center bearing 18 includes a connection plate 72 secured to the walking beam 16 at generally a mid-point of the beam length.

The first counterweight 24 (FIG. 2) is made from a plurality of perforated metal plates 74, which along with the prime mover 44 and gear reducer 46, act as the static counterweight 24. The plates 74 are received onto the beam 16 through openings (not shown). Second openings in the plates 74 receive tie rods 76 mounted on either side of the walking beam 16. Changing the position of the plates 76 along the tie rods 76 changes the counterbalance effect on the load. The tie rods 76 are secured by an angle 78 to the beam 16. The tie rods 76 each have two tightening nuts 80 to secure the plates 74 in position relative to the tie rods 76, all of which is known in the art.

The yoke assembly 28 of the other end 26 of the walking beam 16 includes a slide member 82, through which the other end 26 fits, slideable, with respect to the walking beam 16. (FIG. 10.) The slide member 82 includes a U joint 84 for receiving a transverse connection pin 86 of the horsehead 30 therein. A connection collar 88 of the slide member receives an elongated threaded bolt 90 and a pair of nuts 92 are threaded to the bolt 90 on either side of the collar 88 to secure the slide member 82 in position. A thrust member 94 is secured to the walking beam 16 near the slide member 82 and threadably receives the bolt 90. The slide member 82 is positioned and the nuts 92 are tightened to either side of the collar 88, securing the yoke assembly 28 at a set position. Movement of the yoke assembly 28 provides a variation of both the stroke length and the load to be counterbalanced by the first counterweight 24. It is clear that the pumping unit 10 must be moved to make sure it is over the wellhead if the yoke is moved.

The prime mover 44 is bolted to an underside of the walking beam 16 at the position intermediate the center bearing 18 and the first counterweight 24. A first drive pulley 96 of the prime mover 44 is connected through the gear reducer 46 to the crank 52 to lower the rotational speed of the prime mover 44 to that required for the rotational cycle of the crank 52 and second counterweight 54.

The gear reducer 46 includes a first belt 98 connected between the first drive pulley 96 and a first gear wheel 100, providing a first rotational speed reduction. (FIGS. 3 and 4.) The first gear wheel 100 is conventionally connected to a first axle 105 rotatably connected with respect to the walking beam 16.

A second drive pulley 101 integrally formed with the first gear wheel 100 connects through a second belt 104 to a second gear wheel 102, defining a second rotational speed reduction. The second gear wheel 102 is conventionally mounted to a second axle 107, also mounted for rotational movement on the walking beam. A complementary second gear wheel 102a is belted and mounted for rotation on an opposite lateral side of the walking beam 16, but is not separately driven. This complementary second gear wheel 102a is provided to balance static and torque loads on the walking beam 16.

A third drive pulley 103 is integrally formed with the second gear wheel 102. The third drive pulley 103 is connected to a third gear wheel 106 by a third belt 108, providing third rotational speed reduction means.

The third gear wheel 106 is fixed to a drive axle 110 passing through the walking beam 16. The drive axle 110 is connected on the opposite side of the walking beam to a complementary third gear wheel 106a, the third gear wheel likewise being separately belt driven. A proximate end of each crank 52 is connected adjacent to the third gear wheels 106 and 106a for concurrent movement with the drive axle 110.

A brake lever 112 on the samson post 12 is connected by a brake rods 114 through a linkage 116 mounted on the samson post to a clutch brake 118 connected to the beam 16 and drive axle 110. Pulling the brake lever 112 applies a brake to the drive axle 110 stopping the pumping unit 10 at any position desired, all in a well-known manner.

The terminal end of the crank 52 is rotatably connected to the pitman rod 56 by a wrist pin connection 57. (FIG. 5.) The wrist pin 57 is slideable along the length of the crank 52 in a slot 59. Two pressure plates 61, one on either side of the crank 52, move along the slot 59. The pressure plates each have a pair of lips 63 extending over the crank 52 to functionally engage the crank and an insert edge 65 for sliding along the slot 59.

Bolts 67 secure the two plates 61 together and frictionally hold the wrist pin 57 onto the crank 52. The wrist pin 57 extends toward the pitman rod 56 for connection to a bearing assembly 69 for rotational movement between the pin 57 and assembly 69. The bearing assembly is then rigidly connected as by bolts 71 to the pitman rod. Movement of the wrist pin 57 along the slot infinitely varies the stroke lengths in the pumping cycle between the limits of the ends of the slot.

In an alternative embodiment seen in FIG. 12, like parts being given like numbers with a prime suffix, the walking beam 16 is connected by a vertically oriented link 120 to a second walking beam 122 on which the horsehead 30 is mounted. The second walking beam 122 is pivotally connected at one end 124 to a second samson post 126 which includes a vertical leg 128 and an angled leg 130 interconnecting the second samson post 126 to the first samson post 12. In all other respects the construction is the same. This arrangement is particularly useful to obtain larger stroke movements in the pumping cycle while maintaining the rotating machinery at a relatively low level for easy access and maintenance.

Although the invention has been described with a certain degree of particularity, the scope of the invention is more particularly seen in the appended claims.

What is claimed:

1. A pumping unit for actuating a down hole pump including a walking beam and a post pivotally connected to the walking beam, a base rigidly connected to said post, comprising in combination:
    a prime mover fixedly connected to one of said post or said walking beam;
    a first static counterweight fixedly connected to said walking beam near one end thereof;
    a connection means for connecting pump rods to another end of said walking beam, said pump rods operatively connected to said down hole pump; and
    a second dynamic counterweight rotatably connected to said walking beam for unidirectional rotational movement about an axis intermediate said first counterweight and the pivotal connection to said walking beam, said second counterweight rotatably driven in the unidirectional rotation and at a predetermined rate by said prime mover and said second counterweight operably connected to said base for reciprocating said walking beam about said pivotal connection.

2. The invention as defined in claim 1 wherein said connection means for connecting said pump rods includes a horsehead having an outer convex surface on which a wireline connected to said horsehead lies, said wireline connected to said pump rods, said horsehead slideably mounted on said walking beam for varying the length of the stroke of said pumping unit.

3. The invention as defined in claim 2 wherein said first stationary counterweight substantially counterbalances the load of the horsehead and the pump rods.

4. The invention as defined in claim 3 wherein said second counterweight passes through a maximum lever arm distance where said second counterweight substantially counterbalances fluid being pumped during a work stroke of said pumping unit and a minimum lever arm distance where said pumping unit is in a return stroke.

5. A pumping unit for actuating a down hole pump including a walking beam and a post pivotally connected to the walking beam, said pumping unit having a pumping cycle including a work stroke and a return stroke, comprising in combination:
    means for oscillating said walking beam in said pumping cycle including a prime mover mounted on said walking beam connected through a gear reducer to a crank rotatably mounted at one end on said walking beam nearer one end of said walking beam, said crank rotatably connected at a second end to a pitman rod rotatably connected to a base on which said post is mounted, said one end of said beam having fixedly mounted thereon a first counterweight, said crank mounted for unidirectional rotational movement about an axis through said walking beam intermediate said pivotal connection and said first counterweight, another end of said walking beam operably connected to said pump by pump rods substantially counterbalanced by said first counterweight, a second rotating counterweight connected to the second end of said crank for movement in a rotational cycle about said axis to substantially balance the weight of fluid being pumped during said work stroke and in a preestablished relationship to said work stroke and return stroke.

6. The invention is defined in claim 5 wherein said pivotal connection between said pitman rod and said crank is infinitely variable between a maximum and a minimum limit to thereby vary the stroke length during the cycle.

7. The invention as defined in claim 5 wherein the preestablished relationship between said second counterweight and said pumping unit cycle is such that as the second rotating counterweight rotates from a bottommost position to an uppermost position, said pumping unit moves from a bottommost position to an uppermost position during the work stroke.

8. The invention as defined in claim 7 wherein said movement of said second counterweight between said bottommost position and said uppermost position passes through a point at which a maximum lever arm distance of said second counterweight from said pivotal connection and said movement of said second counterweight from said uppermost position to said bottommost position passes through a minimum lever arm distance of said second counterweight from said pivotal connection.

9. The invention as defined in claim 5 wherein said other end of said walking beam has a horsehead mounted thereon and operably connected to said pump rods, said horsehead slideably connected to said other end of said walking beam for variation of the load to be counterbalanced by said first counterweight.

10. A pumping unit for actuating a down hole pump including a walking beam pivotally connected to a post at approximately a midpoint thereof by a center bearing, said post fixedly secured to a base, said pumping unit having a pumping cycle including a work stroke and a return stroke, comprising in combination:

a prime mover rotating a crank rotatably mounted on said walking beam, said crank interconnected to said post for oscillating said walking beam in said pumping cycle, one end of said walking beam having mounted thereon a first counterweight balancing the load of pump rods connected to another end of said walking beam, said pump rods operably connected to said pump, a second counterweight connected to said crank said second counterweight rotatably connected for rotation about an axis to said beam intermediate said one end and the center bearing, a rotational cycle of said second counterweight in coordinated movement with said pumping cycle, said second counterweight unidirectionally rotating relative to said beam through a maximum lever arm distance from the center bearing pivotal connection between said walking beam and said post as said other end of said beam moves in the work stroke upwardly lifting the pump rods and fluid, said second counterweight unidirectionally rotating relative to said walking beam through a minimum lever arm distance from the center bearing pivotal connection between said walking beam and said post as said other end of said walking beam moves downwardly in the return stroke lowering said pump rods.

11. The invention as defined in claim 10 wherein said maximum lever arm distance and said minimum lever arm distance are defined at points in said rotational cycle wherein said crank is in alignment with said walking beam.

12. The invention as defined in claim 10 wherein said crank and said second counterweight are in alignment with a vertical axis when said pumping unit is beginning one of the work stroke or the return stroke of the pumping cycle.

13. The invention as defined in claim 10 wherein said predetermined movement of said rotational cycle with said pumping cycle is reached by rotating said crank and said second counterweight at a predetermined rotational rate established by interconnecting said prime mover through a gear reducer to said crank.

14. The invention as defined in claim 13 wherein said first counterweight includes as a component thereof said prime mover and said gear reducer, said gear reducer and said prime mover being mounted on said walking beam intermediate said pivotal connection and said one end.

15. The invention as defined in claim 10 wherein a horsehead is slideably connected to said other end of said walking beam, said horsehead connected to said pump rods and comprising a portion of the load counterbalanced by said first counterweight, said horsehead further being slideable along said walking beam for varying the load to be counterbalanced by said first counterweight.

16. The invention as defined in claim 15 wherein said crank has a slot formed along a length thereof and a wrist pin connection selectively securable at any position along the length of said slot to thereby vary the stroke length of said pumping cycle.

* * * * *